United States Patent [19]

Maeda

[11] Patent Number: 4,752,957
[45] Date of Patent: Jun. 21, 1988

[54] APPARATUS AND METHOD FOR RECOGNIZING UNKNOWN PATTERNS

[75] Inventor: Ken-ichi Maeda, Kamakura, Japan

[73] Assignee: Kabushiki Kaisha Toshiba, Japan

[21] Appl. No.: 648,464

[22] Filed: Sep. 7, 1984

[30] Foreign Application Priority Data

Sep. 7, 1983 [JP] Japan .................................. 58-164853

[51] Int. Cl.$^4$ .............................................. G10L 5/00
[52] U.S. Cl. ......................................... 381/42; 382/36
[58] Field of Search ...................................... 381/41–43, 381/45; 382/30, 36

[56] References Cited

U.S. PATENT DOCUMENTS

| | | | |
|---|---|---|---|
| 3,688,267 | 8/1972 | Iijima et al. | 340/146.3 MA |
| 3,700,815 | 10/1972 | Doddington et al. | 381/42 |
| 3,906,446 | 9/1975 | Iijima et al. | 340/146.3 MA |
| 4,060,694 | 11/1977 | Suzuki et al. | 381/45 |
| 4,081,607 | 3/1978 | Vitols et al. | 381/45 |
| 4,282,403 | 8/1981 | Sakoe | 381/43 |

OTHER PUBLICATIONS

Heiiki Riittinen, "Short-Cut Algorithms for the Learning Subspace Method", *IEEE*, 1984, 17.2.1-17.2.4.

*Primary Examiner*—Emanuel S. Kemeny
*Attorney, Agent, or Firm*—Banner, Birch, McKie & Beckett

[57] ABSTRACT

Pattern recognition of speech or print input signal patterns is done by deforming the input signal (parameter vector pattern) to generate a set of orthonormal input patterns (basis vectors), the set compared with pre-stored reference vector patterns for similarity and recognition. The vector comparison involves matrix formation and dot-product maximum eigenvalue calculations.

22 Claims, 9 Drawing Sheets

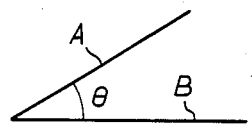
FIG.IA.
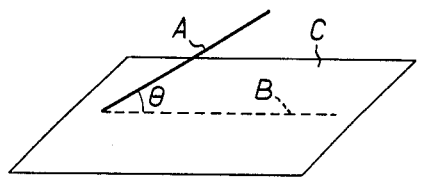
FIG.IB.
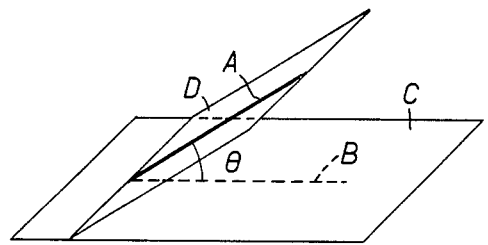
FIG. 2.
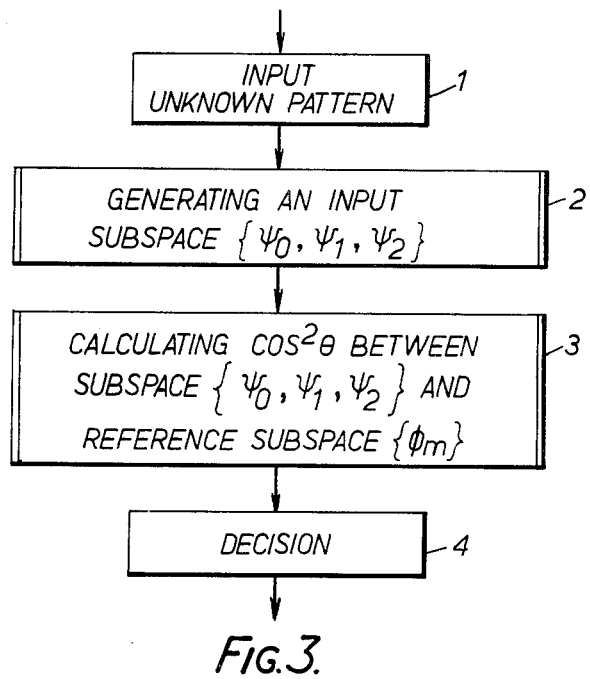
FIG.3.

FIG. II.

APPARATUS AND METHOD FOR RECOGNIZING UNKNOWN PATTERNS

BACKGROUND OF THE INVENTION

The present invention relates to the field of pattern recognition apparatus and, more particularly, is directed to a highly accurate pattern recognition method and apparatus which can reliably recognize malformed and distorted patterns.

Pattern recognition apparatus is commonly used to convert information patterns, such as speech and written characters, to a form suitable for processing and storage by computer systems. Conventional pattern recognition methods are usually based on either a pattern matching scheme or a character extraction scheme. In pattern matching schemes, the identity of a given input pattern is established according to the degree of its similarity to a specific reference pattern. Similarity methods are among the most effective pattern recognition techniques based on a pattern matching scheme. In these methods, a similarity value is calculated between an input pattern and one or more reference patterns for each category of a given pattern set. A category includes all the expected variations of a particular pattern. A comparison between similarity values is used to determine the category to which the input pattern belongs.

The simple similarity method is the most basic of the similarity methods. As shown in FIG. 1A, this method utilizes vectors to represent an input and a reference pattern. The similarity value is calculated as an angle $\theta$ between an input pattern vector A and a reference pattern vector B. The closer angle $\theta$ is to 0, the closer the input pattern matches the reference pattern. Thus, when angle $\theta$ is 0, the input pattern is identical to the reference pattern. In actual practice, an input pattern is identified as belonging to a particular category when angle $\theta$ is within a predetermined range.

The similarity value S which exist between an input pattern f and a reference pattern $f_o$ may be expressed as:

$$S[f, f_o] = \frac{(f, f_o)^2}{\|f\|^2 \|f_o\|^2} \quad (1)$$

where
($f, f_o$) is the scalor product of vector f representing the input pattern and vector $f_o$ representing the reference pattern
$\|f\|$ is the norm for input vector f
$\|f_o\|$ is the norm for reference vector $f_o$.

Any pattern drawn on a plane can be expressed by an n-dimensional vector in the following manner. The plane is divided into n picture elements or cells, each of which has a darkness or density ranging from white through gray to black as a function of its position on the plane. If the positions of the picture elements are expressed as $x_1, x_2, \ldots, x_n$, and the darkness of the picture elements are expressed as $f(x_1), f(x_2), \ldots, f(x_n)$, respectively, vector f can be uniquely defined in n-dimesional coordinates where $f(x_1), (fx_2), \ldots, f(x_n)$ correspond to the projections of vector f on the coordinate axis 1, 2, . . . , n.

The simple similarity defined by equation (1) means that $S[f, f_o]$ takes maximum value 1 when vectors f and $f_o$ in n-dimensional coordinates are parallel and that $S[f, f_o]$ takes minimum value 0 when the vectors are perpendicular. Thus $S[f, f_o]$ varies from value 1 where two patterns on the plane are overlapped, to value 0 where two patterns are quite different from each other.

The simple similarity method has the advantage that the design of a dictionary of standard reference patterns can be created rather easily. This method is also not greatly affected by such local noise as stains or scratches in the patterns. The simple similarity method is affected adversely, however, by such overall changes in the patterns as occur in handwritten letters or voice sound patterns.

One conventional method that has been developed and used to overcome these drawbacks is a multiple similarity method shown, for example, in U.S. Pat. No. 3,688,267 and U.S. Pat. No. 3,906,446. According to this method, a number of secondary reference patterns are provided for each one of the primary reference patterns, each of which corresponds to a deformation of the primary reference pattern. Multiple similarity $S^i$ is expressed as follows:

$$S^i = \sum_{m}^{M} S[f, m] = S[f, m] \quad (2)$$

where Um (m=1, 2, ... M) are the primary and secondary reference patterns. The value for $S^i$ also varies from 0 to 1 in accordance with similarity between the pattern f and the set of reference patterns Um. As shown in FIG. 1B, the similarity value is calculated as an angle $\theta$ between vector A, representing an input pattern, and subspace C constructed from a plurality of vectors representing a particular category of patterns. Subspace C is usually in m-dimensional space but is illustrated in FIG. 1B as a two-dimensional plane. Each vector is associated with a deformation or variation of primary reference pattern B so that a range of malformed or distorted input patterns may be correctly recognized. While the multiple similarity method is useful for recognition of patterns which are subject to overall deformations, the range of deformation determination is limited. That is, only deformations representing small variations of the input patterns can be detected. With respect to handwritten characters and speech, however, there are many more possible variations for the same pattern as compared to printed characters. Because the multiple similarity method can only include a limited number of these variations, the method is not reliable for recognizing written characters and speech patterns which can have a multitude of pattern variations.

Improved methods have been proposed for recognizing handwritten characters and speech patterns. One such method is the combination of the multiple similarity method and another recognition method such as one based on a character extraction scheme. An example of a pattern recognition method based on a character extraction scheme is disclosed in U.S. Pat. No. 3,541,511. In this method, various kinds of characters are extracted from various parts of the patterns and the unknown patterns are recognized by a combination of reference character patterns. The problem in this method, however, has been that complicated algorithmic processing is required. Moreover, a large amount of memory is required for storing the reference patterns. There is also the difficulty that this method cannot be easily automated and much labor is needed to use it.

A method combining the multiple similarity method and the character extraction method is disclosed in the preliminary report for the National Convention of the Electrocommunication Society, page 5-378, published by the Japan Electrocommunication Society. According to this method, the multiple similarity method is applied to the unknown patterns as a first step. In a second step, the character extraction method is applied to the result. While this combined method is useful for the recognition of complicated handwritten letters, the apparatus for realizing the method is, however, complicated and automatic design of the reference pattern dictionary is also difficult.

SUMMARY OF THE INVENTION

It is, therefore, the overall object of the present invention to provide a new and improved pattern recognition apparatus.

It is a specific object of the present invention to provide a new and improved pattern recognition apparatus which is capable of reliably recognizing patterns which are subject to a variety of deformations.

It is another specific object of the present invention to provide a new and improved pattern recognition apparatus which is capable of extending the deformation range in which patterns may be recognized.

It is a further specific object of the present invention to provide a new and improved pattern recognition apparatus which is capable of extending the deformation range in which patterns may be recognized without increasing memory storage requirements over that required by conventional pattern recognition apparatus.

In accordance with the present invention, an unknown input pattern to be recognized is converted into electrical signals representing, for example, the darkness or density of the picture elements forming the input pattern. The signals are stored in an input pattern memory. A basis generating unit is provided for generating a plurality of orthonormalized vectors or bases from the input pattern stored in the input pattern memory. These vectors are used to construct an input subspace of the input pattern. A reference pattern memory is provided for storing a plurality of reference patterns for each category. These reference patterns also comprise a plurality of vectors which are used to construct a reference subspace. A similarity value is defined as an angle $\theta$ between the input subspace and the reference subspace. More specifically, a matrix generating unit and an eigenvalue calculating unit are provided for measuring the angle $\theta$. The matrix generating unit produces a matrix from the orthonormalized vectors generated by the basis generating unit and the reference patterns stored in the reference pattern memory. An eigenvalue calculating unit calculates eigenvalues for the matrix generated by the matrix generating unit. The maximum eigenvalue of the matrix corresponds to angle $\theta$. A decision unit is provided for determining the category to which the input pattern belongs by comparing the eigenvalues representing the category. Thus, it is possible to achieve the above mentioned objectives. Other objects and features of this invention will be apparent from the following description read in connection with the accompanying drawings.

BRIEF DESCRIPTION OF THE DRAWINGS

FIG. 1A illustrates an input pattern represented by vector A and a reference pattern represented by vector B.

FIG. 1B illustrates an input pattern represented by vector A and a plurality of reference patterns represented by subspace C;

FIG. 2 is a simplified example showing the concept of the present invention;

FIG. 3 is a flow chart of the overall operation of the present invention;

DETAILED DESCRIPTION OF THE PREFERRED EMBODIMENT

FIG. 2 illustrates in simplified form the principle concept of the present invention. In accordance with the invention, reference patterns are represented by subspace C. Subspace C is constructed from a plurality of vectors representing a particular category of patterns. Subspace C is usually in M-dimensional space but is illustrated in FIG. 2 in a two-dimensional plane. Each vector is associated with a deformation or variation of primary reference pattern B. The input pattern is represented by subspace D which is constructed from a plurality of vectors. Subspace D is also usually in M-dimensional space but is illustrated in FIG. 2 in a two-dimensional plane. Each vector forming subspace D is associated with a deformation or variation of primary input pattern A. Angle $\theta$ between subspace C and subspace D is used as the similarity value. Angle $\theta$ is defined as a minimun angle between one of the vectors included in subspace C and one of the vectors included in subspace D.

FIG. 3 is a flow chart showing the overall operation of the present invention. An unknown input pattern f is provided in step 1. An input subspace is then generated from input pattern f in step 2. Since a subspace is determined by its basis, bases Um (m=0, 1, ..., M−1) representing the input subspace are generated with respect to deformations of input pattern f, such as might be caused by shifting or position displacement. Hereinafter, the input subspace will be referred to by bases $\psi_0$, $\psi_1$ and $\psi_2$.

In step 3, angle $\theta$ between the input subspace ($\psi_0$, $\psi_1$, $\psi_2$) and a second subspace constructed from a plurality of vectors representing a reference pattern for a certain category is calculated. In practice, it is convenient to calculate values that relate to angle $\theta$, for example $\cos^2 \theta$. These values are calculated for every category. In step 4, a decision is made to determine the category to which input pattern f belongs by comparing the values calculated in step 3.

Figure 4:
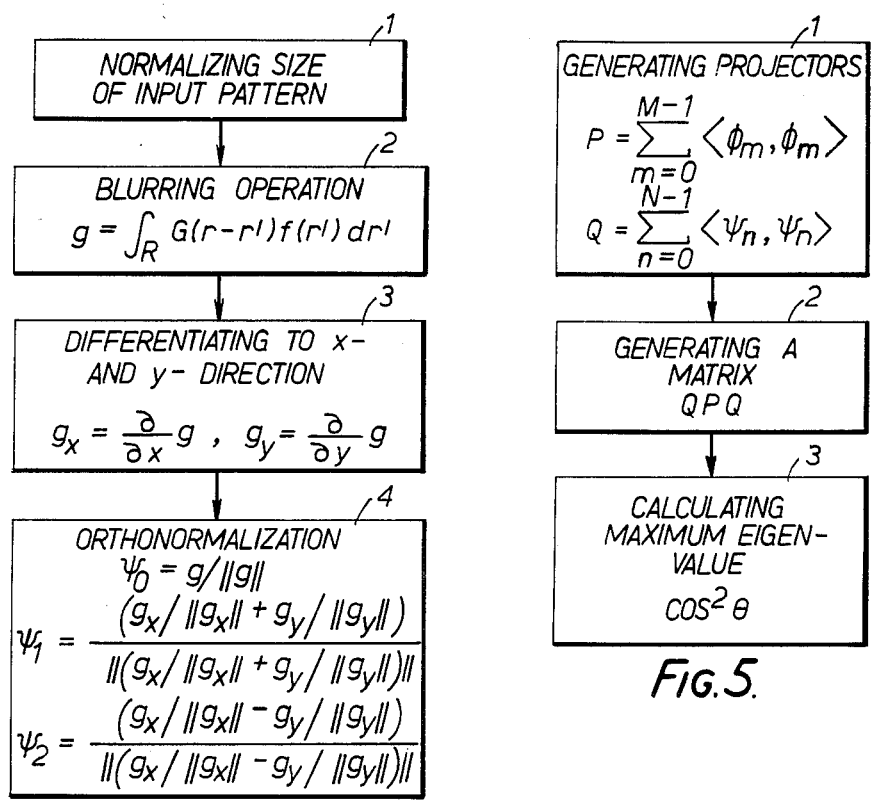
FIG. 4 is a detailed flow chart of step 2 in FIG. 3 showing the basis generating method according to the invention.

FIG. 4 shows a detailed flow chart of step 2 in FIG. 3. In step 1, input pattern f is normalized to adjust its size to the size of the reference patterns. The normalized input pattern f is then blurred in step 2. In a conventional pattern recognition system, blurring is used for reducing the noise components of the input pattern. According to the present invention, however, blurring is also used for reducing the number of dimensional vectors. The blurring operation is executed by the following equation:

$$g(r) = \int_R G(r-r') f(r') dr' \quad (3)$$

where f indicates the normalized input pattern, g indicates a blurred pattern and G is a Gaussian function. The integral calculation included in equation (3) is replaced by a masking operation according to the present invention. In step 3, the amount of shift of blurred pattern g is approximated and a differential value $g_x$ to the x-direction and a differential value $g_y$ to the y-direction are calculated as follows:

$$g_x = \frac{\partial}{\partial x} g, \quad g_y = \frac{\partial}{\partial y} g \quad (4)$$

These partial differential operations are also performed by a masking operation in the present invention. In step 4, pattern g, $g_x$ and $g_y$ are orthonormalized to create bases ($\psi_0$, $\psi_1$, $\psi_2$) for the input subspace as follows:

$$\psi_0 = \frac{g}{\|g\|} \quad (5)$$

$$\psi_1 = \frac{(g_x/\|g_x\| + g_y/\|g_y\|)}{\|(g_x/\|g_x\| + g_y/\|g_y\|)\|} \quad (6)$$

$$\psi_2 = \frac{(g_x/\|g_x\| - g_y/\|g_y\|)}{\|(g_x/\|g_x\| - g_y/\|g_y\|)\|} \quad (7)$$

Here, $\|g\|$ indicates a norm or magnitude of the pattern (vector) g.

Figure 5:
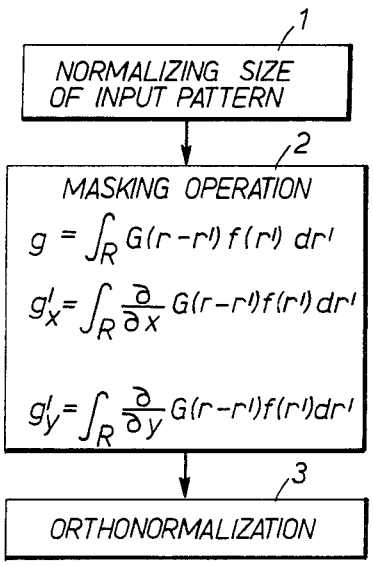
FIG. 5 is a detailed flow chart of step 3 in FIG. 3 showing the similarity calculation method according to the invention.

FIG. 5 shows a flow chart for calculating angle $\theta$ between the input subspace and reference patterns. Angle $\theta$ between subspaces U and V is defined as follows:

$$\cos^2 \theta = \underset{\substack{u \in U \\ v \in V}}{\text{Def. SUP.}} \left( \frac{(u,v)^2}{\|u\|^2 \cdot \|v\|^2} \right) \quad (8)$$

Equation (8) shows that the angle formed by subspaces U and V is defined as the smallest angle of many angles formed between one vector of subspace U and another vector of subspace V. The calculation of equation (8) is obtained by utilizing projectors P and Q of subspaces U and V. Projectors P and Q are calculated as follows:

$$P = \sum_{m=0}^{M-1} <\phi_m, \phi_m> \quad (9)$$

$$Q = \sum_{n=0}^{N-1} <\psi_n, \psi_n> \quad (10)$$

Here, $\phi m$ (m=0, 1, ..., m−1) are m-dimensional reference patterns of subspace U, $\psi n$(n=0, 1, ..., n−1) are n-dimensional bases of subspace V, and $<>$ indicates a dyad operation.

Accordingly, the characteristics of projectors $$u = Pu \quad (u \in U)$$
$$v = Qv \quad (v \in V)$$

are satisfied. Suppose that vector u can be resolve as:

$$u = Qu + u'$$
$$(Qu \in V, u' \in V)$$

Thus, equation (8) can be modified as follows:

$$\cos^2 \theta = \underset{u \in U}{\text{Def. SUP.}} \left( \frac{[(Qu + u'), \alpha Qu]^2}{\|u\|^2 \cdot \|\alpha Qu\|^2} \right)$$

$$= \underset{u \in U}{\text{Def. SUP.}} \left( \frac{\|QPu\|^2}{\|u\|^2} \right) = \|QP\|^2$$

where $\|QP\|$ is defined as follows:

$$\|QP\| = \underset{X}{\text{DEF. SUP.}} \left( \frac{\|QPx\|}{\|x\|} \right)$$

The following relationship, therefore, is satisfied.

$$\|QP\|^2 = \|(QP)^*(QP)\| = \|PQP\|$$

This value represents the maximum eigenvalue of matrix PQP and is equal to the maximum eigenvalue of matrix QPQ. Therefore, it is possible to calculate $\cos^2 \theta$ between subspaces U and V by obtaining the maximum eigenvalue of matrix PQP or QPQ. For the purpose of obtaining eigenvalues, a power method may be used.

Considering a simplified example in which total space is a three-dimensional space whose coordinate system $\phi$ consist of x, y and z, unit vectors i, j and k on the x-axis, y-axis and z-axis are indicated by:

$$i = \begin{pmatrix} 1 \\ 0 \\ 0 \end{pmatrix}, j = \begin{pmatrix} 0 \\ 1 \\ 0 \end{pmatrix}, k = \begin{pmatrix} 0 \\ 0 \\ 1 \end{pmatrix}$$

It is assumed that subspace U is along the x-y plane of the three-dimensional space and subspace V is along the z-axis. Thus, projectors P and Q are as follows:

$$P = <i,i> + <j,j> = \begin{pmatrix} 1 & 0 & 0 \\ 0 & 1 & 0 \\ 0 & 0 & 0 \end{pmatrix}$$

$$Q = <k,k> = \begin{pmatrix} 0 & 0 & 0 \\ 0 & 0 & 0 \\ 0 & 0 & 1 \end{pmatrix}$$

The maximum eigenvalue is determined as follows:

$$PQP = \begin{pmatrix} 1 & 0 & 0 \\ 0 & 1 & 0 \\ 0 & 0 & 0 \end{pmatrix}\begin{pmatrix} 0 & 0 & 0 \\ 0 & 0 & 0 \\ 0 & 0 & 1 \end{pmatrix}\begin{pmatrix} 1 & 0 & 0 \\ 0 & 1 & 0 \\ 0 & 0 & 0 \end{pmatrix} = \begin{pmatrix} 0 & 0 & 0 \\ 0 & 0 & 0 \\ 0 & 0 & 0 \end{pmatrix}$$

In this case, the maximum eigenvalue becomes "0" so that $\cos^2 \theta$ is 0. This means that angle $\theta$ between subspaces U and V is 90°.

In another example, it is assumed that subspace U is along the x-y plane and subspace V is along the y-z plane. Thus, projectors P and Q are as follows:

$$P = \begin{pmatrix} 1 & 0 & 0 \\ 0 & 1 & 0 \\ 0 & 0 & 0 \end{pmatrix}, Q = \begin{pmatrix} 0 & 0 & 0 \\ 0 & 1 & 0 \\ 0 & 0 & 1 \end{pmatrix}$$

Accordingly, matrix PQP becomes:

$$PQP = \begin{pmatrix} 1 & 0 & 0 \\ 0 & 1 & 0 \\ 0 & 0 & 0 \end{pmatrix}\begin{pmatrix} 0 & 0 & 0 \\ 0 & 1 & 0 \\ 0 & 0 & 1 \end{pmatrix}\begin{pmatrix} 1 & 0 & 0 \\ 0 & 1 & 0 \\ 0 & 0 & 0 \end{pmatrix} = \begin{pmatrix} 0 & 0 & 0 \\ 0 & 1 & 0 \\ 0 & 0 & 0 \end{pmatrix}$$

The maximum eigenvalue is therefore, "1", so that angle $\theta$ is 0°.

As a further example, it is assumed that subspace U is along the x-y plane and subspace V is formed from vector 0, 0, 1 and vector 1, 1, 0. Thus, projectors P and Q are as follows:

$$P = \begin{pmatrix} 1 & 0 & 0 \\ 0 & 1 & 0 \\ 0 & 0 & 0 \end{pmatrix}$$

$$Q = <\frac{i+j}{\sqrt{2}}, \frac{i+j}{\sqrt{2}}> + <k,k> = \begin{pmatrix} \frac{1}{2} & \frac{1}{2} & 0 \\ \frac{1}{2} & \frac{1}{2} & 0 \\ 0 & 0 & 1 \end{pmatrix}$$

Accordingly, matrix PQP becomes:

$$PQP = \begin{pmatrix} 1 & 0 & 0 \\ 0 & 1 & 0 \\ 0 & 0 & 0 \end{pmatrix}\begin{pmatrix} \frac{1}{2} & \frac{1}{2} & 0 \\ \frac{1}{2} & \frac{1}{2} & 0 \\ 0 & 0 & 1 \end{pmatrix}\begin{pmatrix} 1 & 0 & 0 \\ 0 & 1 & 0 \\ 0 & 0 & 0 \end{pmatrix} = \begin{pmatrix} \frac{1}{2} & \frac{1}{2} & 0 \\ \frac{1}{2} & \frac{1}{2} & 0 \\ 0 & 0 & 0 \end{pmatrix}$$

The characteristic equation for matrix PQP is:

$$\begin{vmatrix} \frac{1}{2} - \lambda & \frac{1}{2} & 0 \\ \frac{1}{2} & \frac{1}{2} - \lambda & 0 \\ 0 & 0 & -\lambda \end{vmatrix} = 0$$

Therefore, $$(\tfrac{1}{2} - \lambda)^2 (-\lambda) - (-\lambda) \cdot \tfrac{1}{4} = 0$$

$$\lambda^2 - \lambda = 0$$

$$\lambda = 0 \text{ or } 1$$

The maximum eigenvalue is "1" in this example so that angle $\theta$ is 0°.

In a further example, it is assumed that subspace U is along the x-y plane and that the subspace is a vector 0, 1, 1. Projectors P and Q are given by:

$$P = \begin{pmatrix} 1 & 0 & 0 \\ 0 & 1 & 0 \\ 0 & 0 & 0 \end{pmatrix}, Q = \begin{pmatrix} 0 & 0 & 0 \\ 0 & \frac{1}{2} & \frac{1}{2} \\ 0 & \frac{1}{2} & \frac{1}{2} \end{pmatrix}$$

And matrix PQP is therefore:

$$PQP = \begin{pmatrix} 0 & 0 & 0 \\ 0 & \frac{1}{2} & 0 \\ 0 & 0 & 0 \end{pmatrix}$$

The maximum eigenvalue of matrix PQP is $\frac{1}{2}$. Thus, $\cos^2 \theta$ is equal to $\frac{1}{2}$ so that angle $\theta$ between subspaces U and V is 45°.

Figures 6, 7:
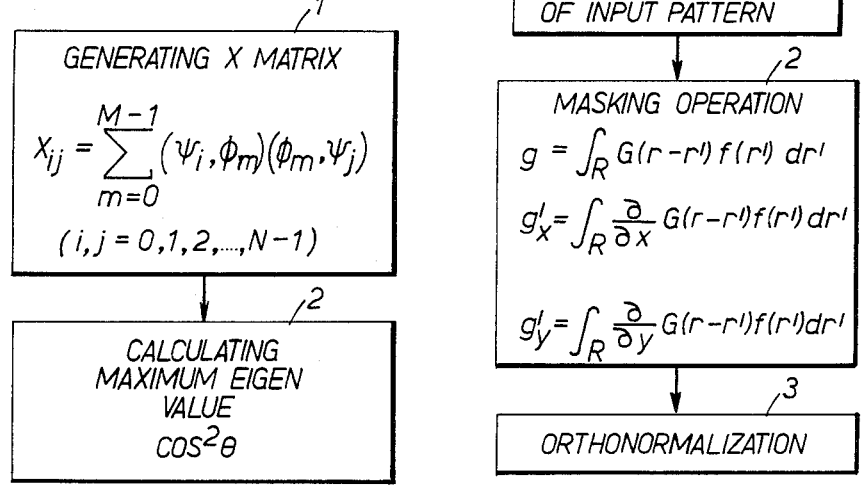
FIG. 6 is a detailed flow chart of step 2 in FIG. 3 showing another similarity calculation method according to the invention.
FIG. 7 is a detailed flow chart of step 2 in FIG. 3 showing another basis generating method according to the invention.

FIG. 6 shows another flow chart for calculating angle $\theta$ between the input subspace and a reference subspace in which the required number of calculation steps are reduced in comparison to the flow chart shown in FIG. 5.

The eigenvalue relating to matrix QPQ can be considered as:

$$QPQv = \lambda v \qquad (11)$$

Because vector v belongs to subspace V ($v \in V$), it is expressed as follows:

$$v = \sum_{k=0}^{N-1} a_k \psi_k$$

Thus, the left side of equation (11) is expressed as:

$$\begin{aligned} QPQv &= \sum_{l=0}^{N-1} \sum_{m=0}^{M-1} \sum_{n=0}^{N-1} <\psi_l,\psi_l><\phi_m,\phi_m><\psi_n,\psi_n>v \\ &= \sum_{k=0}^{N-1} \sum_{l=0}^{N-1} \sum_{m=0}^{M-1} \sum_{n=0}^{N-1} (\psi_l,\phi_m)(\phi_m,\psi_n)(\psi_n,\psi_k) a_k \psi_l \\ &= \sum_{l=0}^{N-1} \sum_{m=0}^{M-1} \sum_{n=0}^{N-1} (\psi_l,\phi_m)(\phi_m,\psi_n) a_n \psi_l \end{aligned}$$

The right side of equation (11) is expressed as:

$$\lambda v = \sum_{k=0}^{N-1} \lambda a_k \psi_k$$

Therefore, $\psi_k$ in these equations:

$$\lambda a_k = \sum_{m=0}^{M-1} \sum_{n=0}^{N-1} (\psi_k, \phi_m)(\phi_m, \psi_n) a_n$$

is satisfied. By expressing $a_n$ as:

$$a = {}^t(a_0, a_1 \cdots a_{n-1})$$

The following relationship may be used to produce the matrix rather than the relationship shown by equation (11) above:

$$\lambda a = Xa, X = (X_{ij}) \quad (12)$$

$$X_{ij} = \sum_{m=0}^{M-1} (\psi_i, \phi_m)(\phi_m, \psi_j)$$

Accordingly, matrix X (equation 12) is generated in step 1 in FIG. 6. The maximum eigenvalue of matrix X is calculated in step 2. The dimension of matrix X is small compared to the dimension of matrix QPQ.

FIG. 7 is a flow chart of another example for obtaining bases. The difference between FIGS. 4 and 7 is in the masking operation. According to the flow chart in FIG. 7, three mask patterns are prepared in advance. The first mask pattern is that of the Graussion function as in FIG. 4. The second mask pattern is obtained by x-directional partial-differentiation of the Graussian function and the third mask pattern is obtained by y-directional partial-differentiation of the Graussion function. Thus, three vectors are given by:

$$g = \int_R G(r - r')f(r')dr' \quad (13)$$

$$g_x = \int_R \frac{\partial}{\partial x} G(r - r')f(r')dr'$$

$$g_y = \int_R \frac{\partial}{\partial y} G(r - r')f(r')dr'$$

The orthonormalizing step 3 is the same as step 4 in FIG. 4.

According to the invention, an unknown input pattern is expressed by the input subspace being n-dimensional space and reference patterns are expressed by the reference subspace being m-dimensional space. The angle between the input subspace and the reference subspace is calculated as a measure of similarity. Thus, a wide range of deformations of the input pattern is possible allowing more accurate recognition of the input pattern.

Figure 8:
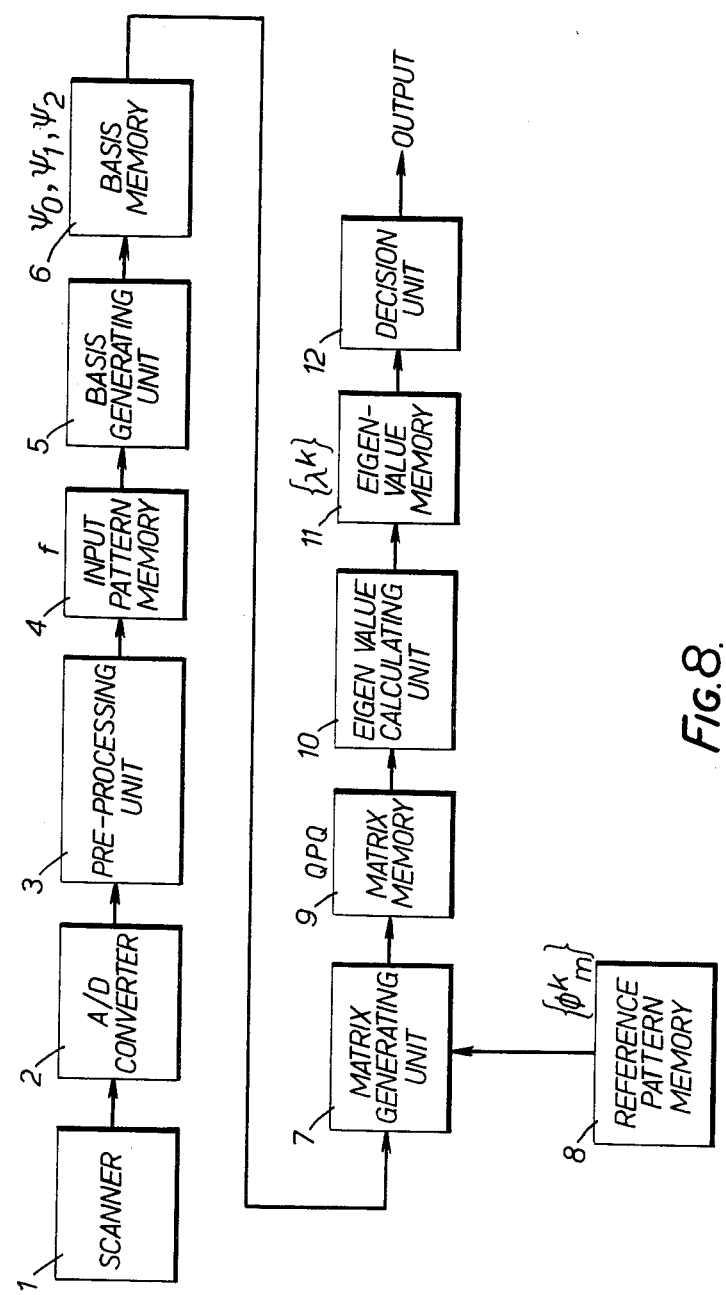
FIG. 8 is a block diagram of the pattern recognition apparatus in accordance with one embodiment of the present invention.

FIG. 8 is a block diagram of a preferred embodiment of the pattern recognition apparatus according to the invention. The apparatus can serve as a handwritten character reader which recognizes character patterns such as Japanese kanji-characters, Japanese kama-characters and alphanumeric characteristis. Character patterns are written on a sheet and the sheet is divided into n picture elements or cells. Each cell has a darkness or density ranging from white to black as a function of its position on the sheet. The sheet is optically scanned by a scanner in block 1 which usually comprises CCD (charged Coupled Device) sensors for obtaining electrical signals which represent the darkness or density of each picture element on the sheet. The output signals of scanner 1 are converted to digital signals by an A/D (Analog to Digital) converter in block 2. The digital signals obtained from the A/D converter are supplied to a pre-processing unit in block 3. The pre-processing is used to eliminate noise and to normalize the size of the input character pattern to adjust it to the size of the reference patterns hereinafter described.

The normalized input pattern data in the form of digital signals associated with each of the picture elements on the sheet is stored in an input pattern memory in Block 4. The input pattern data stored in the input pattern memory is hereinafter considered as being an input vector f where the position of the picture elements on the sheet are expressed as $x_1, x_2, \ldots, x_n$ and the darkness of the picture elements are expressed as $f(x_1) f(x)_2), \ldots, f(x_n)$, respectively. Thus, vector f may be uniquely defined in n-dimensional coordinates where $f(x_1), f(x_2), \ldots, f(x_n)$ correspond to the projections of vector f on the coordinate axis $1, 2, \ldots, n$.

A basis generating unit is provided in block 5 for generating three bases $\psi_0, \psi_1$, and $\psi_2$ relating to input vector f. The functions of the basis generating unit are:

(a) to obtain a blurred vector g by blurring input vector f;

(b) to obtain two differentiated vectors gx and gy corresponding to the x-direction and y-direction, respectively, on a two dimensional plane by differentiating blurred vector g; and (c) to derive three bases vectors $\psi_0, \psi_1$, and $\psi_2$ which are orthonormalized to each other from vectors g, gx and gy. The bases vectors are written into the bases memory in block 6.

A matrix generating unit is provided in block 7 for generating a QPQ matrix. The matrix unit generates a projection operator Q from the three bases vectors, and a projection operator P from the vectors representing the reference patterns which are stored in reference pattern memory 8. The matrix unit then calculates the QPQ matrix and supplies it to a matrix memory in block 9. The reference patterns stored in the reference pattern memory in block 8 are the same type of patterns disclosed in U.S. Pat. No. 3,906,446 and include a plurality of reference patterns for each category of pattern, each respective pattern being orthonormalized to the other patterns. A reference pattern is indicated hereinafter by a vector $\phi^k_m$ being the m-th reference pattern of the k-th category.

An eigenvalue calculating unit is provided in block 10 for obtaining eigenvalues for the QPQ matrix QPQ. Eigenvalues are stored in an eigenvalue memory in block 11 and supplied to a decision unit in block 12. The decision unit determines the maximum eigenvalue and identifies the category to which the input character pattern belongs.

Figure 9:
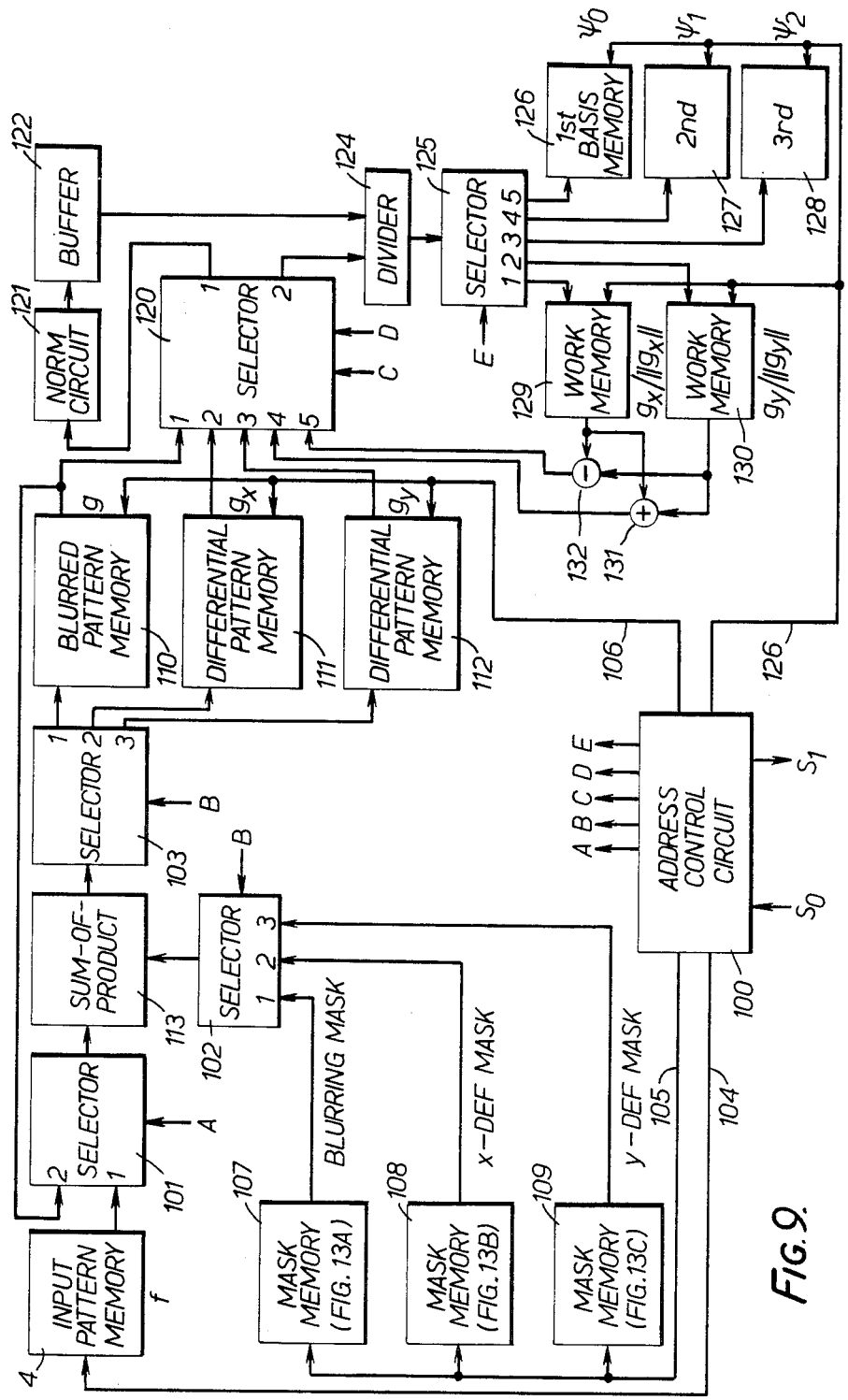
FIG. 9 is a detailed block diagram of basis generating unit 5 shown in FIG. 8 performing the operations in FIG. 4.
Figures 12, 13A, 13B, 13C, 16A, 16B:
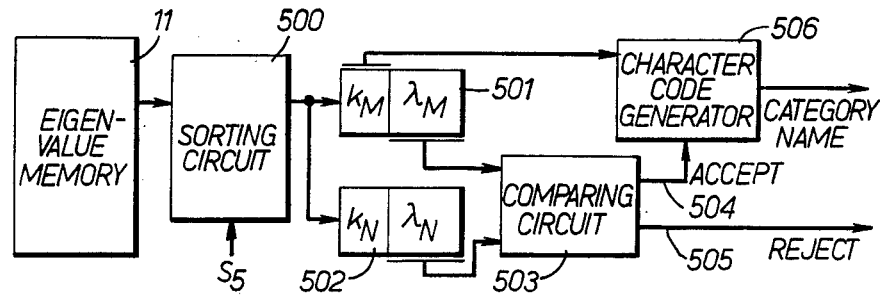
FIG. 12 is a detailed block diagram of decision unit 12 shown in FIG. 8.
FIG. 13A is an example of a blurring mask pattern to be stored in mask pattern memory 107 in FIG. 9.
FIG. 13B is an example of an x-direction differential pattern to be stored in mask pattern memory 108 in FIG. 9.
FIG. 13C is an example of a y-direction differential pattern to be stored in mask pattern memory 109 in FIG. 9.
FIG. 16A is an example of differentiated blurring mask 108' to be stored in the mask pattern memory shown in FIG. 15.
FIG. 16B is another example of a differentiated blurring mask 109' to be stored in the mask pattern memory in FIG. 15.

FIG. 9 shows an example of the basis generating unit in block 5 in FIG. 8. An address control circuit 100 supplies required addresses to the various memory units and selection signals to the various selector circuits in the basis generating unit. Lines for supplying selection signals are shown only by arrows to simplify the drawing. A signal SO is received from the pre-processing unit in block 3 indicating the start of the operation. Circuit 100 provides signal A to selector 101 for selecting terminal 1 of selector 101. Circuit 100 also provides signal B to selector 102 and selector 103 for selecting their respective terminal 1. Circuit 100 then successively supplies addresses to lines 104, 105, and 106, respectively. The address on line 104 is supplied to the input pattern memory in block 4 so that it outputs the data for each of the picture elements of input vector f. The address on line 105 is supplied to mask memories 107, 108 and 109 so that they output each data element for corresponding mask data. The address on line 106 is supplied to blur pattern memory 110 and differential pattern memories 111, 112. Therefore, the data associated with each picture element of input vector f and each picture element of mask memory 107 are supplied to sum-of-product circuit 113 to produce a blurred vector g. Circuit 113 executes a calculation between vector f and the mask data in a well-known manner such as by calculating the sum of the inner product of the vector f and the mask data. Accordingly, blurring of the input pattern is realized by the blurring mask data stored in mask memory 107. A Gaussian function, such as shown by the table in FIG. 13A, is suitable for the blurring mask data.

The outputs of sum-of-product circuit 113 is successively stored in blurred pattern memory 110 through selector 103. After the blurring operation for obtaining blurred vector g, address control circuit 100 provides signal A indicating the selection of terminal 2 of selector 101 and signal B indicating the selection of terminal 2 of selectors 102 and 103. The next operation is to obtain a differentiated vector gx. For this purpose, mask memory 108 contains x-direction differential mask data such as shown by the table in FIG. 13B. Each data element of blurred vector g stored in blurred pattern memory 110 is successively read out according to the address on line 106 and is supplied to the sum-of-product circuit 113 through selector 101. At the same time, each data element of the x-direction differential mask data is supplied from mask memory 108 through selector 102. The sum-of-product circuit 113 calculates each data element of partially differentiated vector gx and provides it to differential pattern memory 111 through selector 103.

After obtaining differentiated vector gx, address control circuit 100 outputs signal B indicating selection of terminal 3 of selectors 102 and 103 for the operation of y-directional partial differentiation of blurred vector g. In accordance with an operation similar to the above described operation for obtaining vector gx, partial differentiated vector gy is obtainded using y-direction differential mask data such as shown in the table in FIG. 13C which is written into differential pattern memory 112.

The next step is to derive three bases $\psi_0$, $\psi_1$ and $\psi_2$. Basis $U_0$ is obtained by normalizing vector g stored in blurred pattern memory 110. Address control circuit 100 provides selection signal C for indicting the selection of input terminal 1 of selector 120 and a selection signal D for indicating selection output terminal 1 of selector 120. Circuit 100 then supplies addresses to blurred pattern memory 110. Each data element of blurred vector g is succesively supplied to norm circuit 121 through selector 120. Norm circuit 121 calculates the norm or magnitude of the input vector and comprises a squaring circuit for squaring each data element, a summation circuit for adding the squared values and a square root circuit for taking the square root of the summed values. Norm circuit 121 provides norm $\|g\|$ of blurred vector g to buffer 122.

Address control circuit 100 then provides selection signal D indicating the selection of output terminal 2 of selector 120. Circuit 100 also provides selection signal E indicating the selection of terminal 5 of selector 125 and then provides addresses to lines 106 and 126. Accordingly, each data element of blurred vector g is supplied to divider 124 through selector 120. Another input of divider 124 is supplied with data from the output of buffer 122. Divider 124 divides each data element of blurred vector g by norm $\|g\|$. The output of divider 124 is written into first base memory 126 through selector 125. The contents of first base memory 126 is base vector $\psi_0$.

Before obtaining base vectors $\psi_1$ and $\psi_2$, vector gx and gy are normalized. This operation is similar to the operation discussed above with respect to first base vector $\psi_0$. That is, input terminal 2 and output terminal 1 of selector 120 are selected and supplies each data element of vector gx stored in differential pattern memory 111 to norm circuit 121. The calculated norm value is stored in buffer memory 122. Next, each data element of vector gx is supplied to divider 124 by selecting output terminal 2 of selector 120. The output of divider 124 is written into a first work or scrath pad memory 129 by selecting terminal 1 of selector 125. Work memory 129 stores normalized vector $gx/\|gx\|$. Similarly, normalized vector $gy/\|gy\|$ is stored in a second work memory 130 by the operation of selectors 120, 125 and address control of memory 112 and 130.

Address control circuit 100 then provides selection signal C indicating the selection of input terminal 4 and selection signal D indicating the selection of output terminal 1 of selector 120. Work memories 129 and 130 successively output each data element of the normalized vectors according to addresses supplied from line 126. Adder 131 adds these data elements and subtractor 132 subtract the data elements of work memory 130 from the data elements of work memory 129. Input terminal 4 of selector 120 is then selected so that the output of adder 131 is supplied to norm circuit 121. Thus, norm value $\|gx/\|gx\| + gy/\|gy\|\|$ is stored in memory buffer 122. After the calculation of the norm value, address control circuit 100 provides selection signal D indicating the selection of output terminal 2 and supplies addresses to line 126 with selection signal E indicating the selection of terminal 4 of selector 125. The output of adder 131 is supplied to divider 124 and the output of divider 124 is supplied to second memory 127. Second memory 127 stores orthonormalized base $\psi_1$. Similarly, third base $\psi_2$ is generated and stored in a third memory 128 using the output of subtractor 132.

Figure 10:
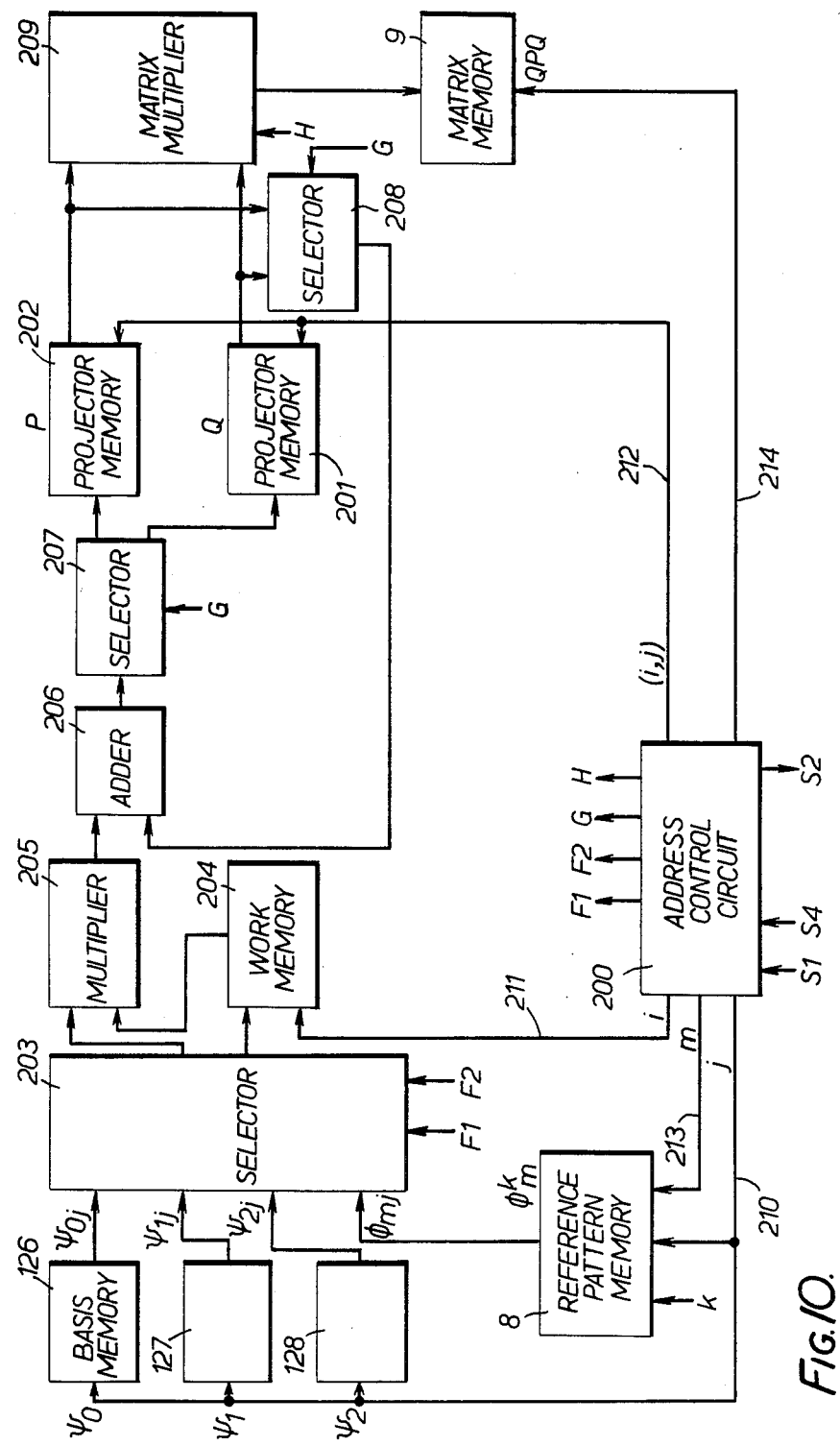
FIG. 10 is a detailed block diagram of matrix generating unit 7 shown in FIG. 8 performing the operations shown in steps 1 and 2 of FIG. 5.

FIG. 10 shows an example of the matrix generating unit of block 7 in FIG. 8. Address control circuit 200 is operated in response to an end signal supplied from address control circuit 100 in FIG. 9 at the end of the generation of the three base vectors. Circuit 200 clears projection memories 201, 202.

The matrix generating unit first generates a projector Q. Circuit 200 provides selection signals F1 and F2 to selector 203, each indicating the selection of input terminal 1 and output terminal 2 of selector 203, respectively. Circuit 200 then supplies addresses to first base memory 126 and work memory 204 through lines 210 and 211 so that every data element of first base $\psi_0$ are transformed to work memory 204 through selector 203. After transferring the first base, circuit 200 supplies selection signal F2, indicating the selection of output terminal 1 of selector 203, and selection signal G, indicating the selection of terminal 1 of selectors 207 and 208. First base memory 126 outputs a data element $\psi_{0j}$ in response to an address j from circuit 200.

Work memory 204 provides element data $\psi_{0i}$ in response to address i from circuit 200. These data elements $\psi_{0j}$ and $\psi_{0i}$ are supplied to multiplier 205. Circuit 200 supplies a pair of addresses (i,j) to projection memories 201, 202 through line 212. Since selector 208 reflects the outputs of projection memory 201, a data element of projector Q is supplied to adder 206 through selector 208. Adder 206 adds the output of multiplier 205 to the data elements of projector Q. The output of the adder is written into the same address of the projector memory Q. Such operation is repeated for every j (j=1, 2, ..., n) and every i (i=1, 2 ..., n), wherein n is the number of data elements of base $\psi_0$.

A similar operation is further executed for the other base vectors $\psi_1$ and $\psi_2$. Referring to second base $\psi_1$, circuit 206 selects input terminal 2 and output terminal 2 and transfers second base $\psi_1$ into work memory 204. Then circuit 200 controls the address of memories 127, 204 and 201, so that the multiplied value $\psi_{1j} \psi_{1i}$ is accumulated into the (i,j) data elements of projector Q of projector memory 201. Referring to the third basis $\psi_2$, each data element is transferred to work memory 204. Each multiplied value $\psi_{2j} \psi_{2i}$ is then accumulated into the (i,j) element data of projector Q. Therefore, projector memory 201 is now storing projector Q corresponding to three bases $\psi_0$, $\psi_1$ and $\psi_2$.

The second stage of operation of the matrix generating unit is to generate a projector P from the reference pattern which is similar to the first stage of operation except that circuit 200 accesses reference pattern memory 8 and projection memory 202. Pk hereafter indicates projector P of the k-th category. Each element date of the projector Pk is given by:

$$\sum_{n=1}^{M} \phi_{nj}^k = \phi_{ni}^k$$

wherein M is the number of reference patterns of k-th category. Reference pattern $\phi_1^k$ of the k-th category is initially transferred to work memory 204 designating m=1 through line 213 by circuit 200 and category data k from a k counter as described below. After the selection of terminal 2 of selectors 207 and 208, circuit 200 supplies addresses to the memories, so that the output of multiplier 205 is accumulated into projector memory 202. Such operation is repeated m times for every reference pattern of the k-th category. The k-th projector Pk corresponding to the k-th category is created in projector memory 202.

The third step of matrix generating unit 7 generates a multiplied matrix QPkQ using projectors Q and Pk. Circuit 200 supplies a driving signal H to matrix multiplier 209 which multiplies projector Pk by the projector Q and thereafter multiplies projector Q by the multiplied matrix QPk. The result is written into matrix memory 9 according to addresses supplied from circuit 100 through line 214.

Figure 11:
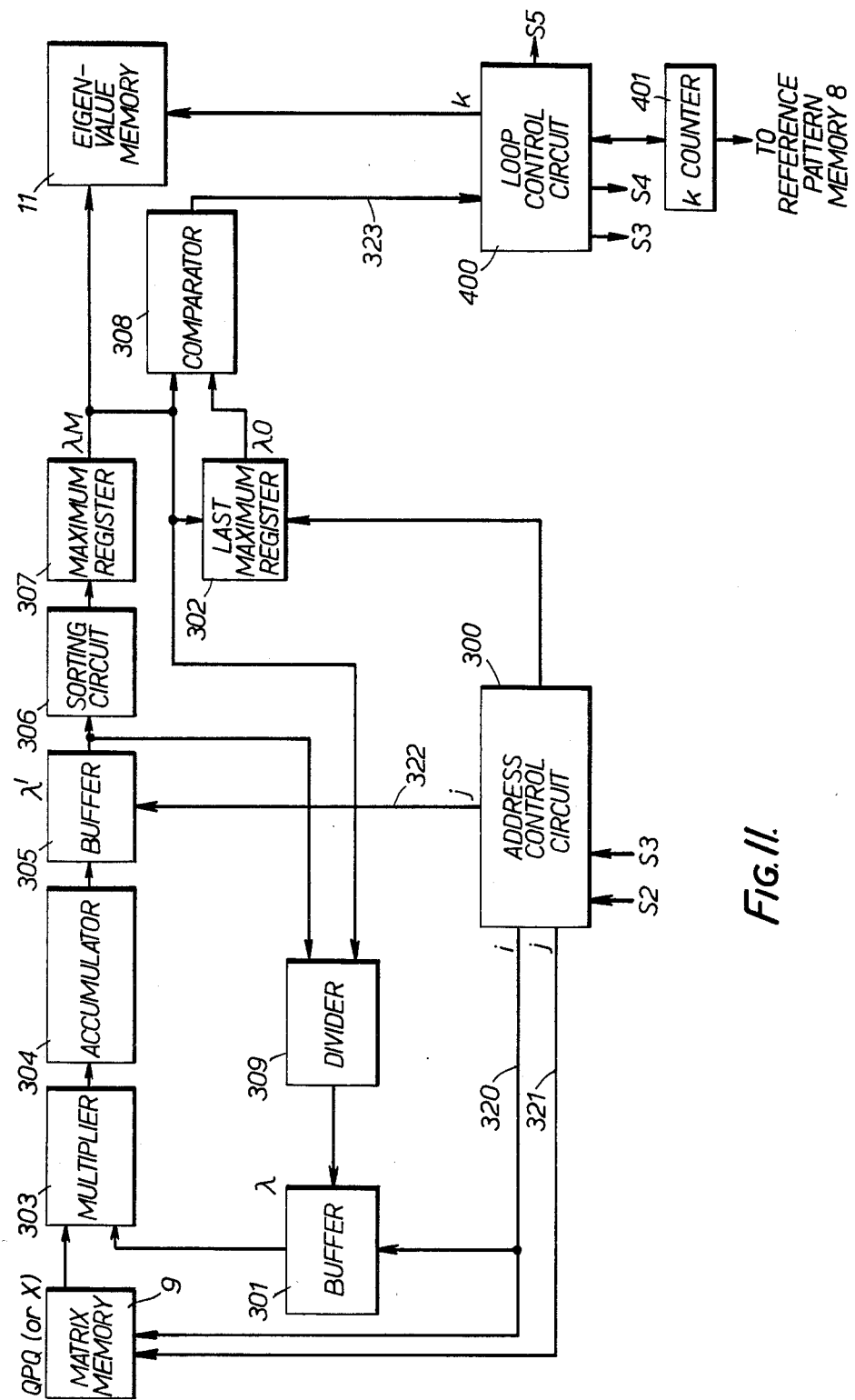
FIG. 11 is a detailed block diagram of eigenvalue calculating unit 10 shown in FIG. 8 performing the operation shown in step 3 of FIG. 5.

FIG. 11 shows an example of eigenvalue calculating unit 10 in FIG. 8. Unit 10 finds the maximum eigenvalue of the matrix in the matrix memory 9 according to the power method. Responding to an end signal S2 outputted from address control circuit 200, address control circuit 300 initializes buffer 301 and a last maximum register 302. Since the power method is an itirative calculation, the initial eigenvalue data for buffer 301 is arbitrary, being denoted by $\lambda_i (i=1, 2, \ldots, N_e)$.

Circuit 300 supplies addresses $j(j=1, 2, \ldots, N_e)$ to matrix memory 9 designating the row of the matrix through line 321. Circuit 300 also supplies addresses $i(i=1, 2, \ldots, N_e)$ to matrix memory 9 and buffer 301 before the increment of address j. Therefore, multiplier 303 successively multiplies i-th element data of the j-th row in the matrix and i-th initialized eigenvalue $\lambda i$. The output of multiplier 303 is accumulated by accumulator 304 for each row of the matrix. The accumulated value of accumulator 304 is sent to buffer 305 according to address j on line 322. After repeating these operations, the buffer stores the calculated eigenvalues. Then maximum detector 306 searches for the maximum eigenvalue $\lambda_M$ from buffer 305. The eigenvalue is stored in maximum register 307. Comparator 308 is provided for comparing output $\lambda_M$ of maximum register 307 and output $\lambda_O$ of last maximum register 302. If $\lambda_O - \lambda_M < \Delta\lambda (\Delta\lambda$ is a threshold value), comparator 308 outputs a logic "1" on line 323. If $\lambda_O - \lambda_M \geq \Delta\lambda$, comparator 308 outputs a logic "O".

When the signal on line 323 is "O", loop control circuit 400 outputs a recalculating signal S3 to address control circuit 300. Circuit 300 provides a set signal to last maximum register 302 through line 323 for setting the maximum eigenvalue $\lambda_M$ as the last maximum value $\lambda_O$. Circuit 300 supplies the same addresses to buffers 301 and 305 through lines 320, 322. Each eigenvalue of buffer 705 is read out and supplied to divider 309. Divider 309 divides each eignevalue by maximum eigenvalue $\lambda_M$. The output of divider 309 is stored in buffer 301. After this, recalculation of the eigenvalues is repeated. Recalculation is repeated until $\lambda_O - \lambda_M < \Delta\lambda$ is satisfied.

When the signal on line 323 is "1", loop control circuit 400 outputs address k to eigenvalue memory 11 in order to set the maximum eigenvalue $\lambda_M$ as the maximum value of the k-th category. Circuit 400 increments k counter 401 which contents indicate the present category being calculated when the contents of the k counter is not K and outputs a repeating signal S4 to address control circuit 200 in FIG. 10. Address control circuit 200 controls calculating a new projector Pk and calculating a new matrix QPkQ.

Eigenvalue calculating unit 10 also calculates eigenvalues for the new matrix. Therefore, when the contents of k counter 401 becomes K, each maximum eigenvalue for each category is stored in eigenvalue memory 11. At that time, circuit 400 provides an end signal to decision unit 12.

FIG. 12 shows an example of decision unit 12 in FIG. 8 which responds to end signal S5. A sorting circuit 500 compares the eigenvalues to each other in the eigenvalue memory 11 and provides the maximum eigenvalue $\lambda_M$ with its address $K_M$ to register 501 and the secondary largest eigenvalue $\lambda_N$ with its address $K_N$ to register 502. Eigenvalues $\lambda_M$ and $\lambda_N$ are supplied to comparing circuit 503.

Comparing circuit 503 provides an accept signal to line 504, where $\lambda_M > \theta_1$ and $\lambda_M - \lambda_N > \theta_2$, wherein $\theta_1$ and $\theta_2$ are threshold values for decision operation. If $\lambda_M \leq \theta_1$, or $\lambda_M - \lambda_N \leq O_2$, comparing circuit 503 provides a reject signal on line 505 indicating the apparatus cannot recognize the input pattern.

Responding to the accept signal, a character code generator 506 is activated comprising a Read Only Memory which generates a character code corresponding to the address data $k_m$ representing the category to which the input pattern belongs.

According to the aforementioned embodiment, the apparatus can recognize more varieties of deformed input patterns than conventional apparatus which utilizes the multiple similarity method.

Figure 14:
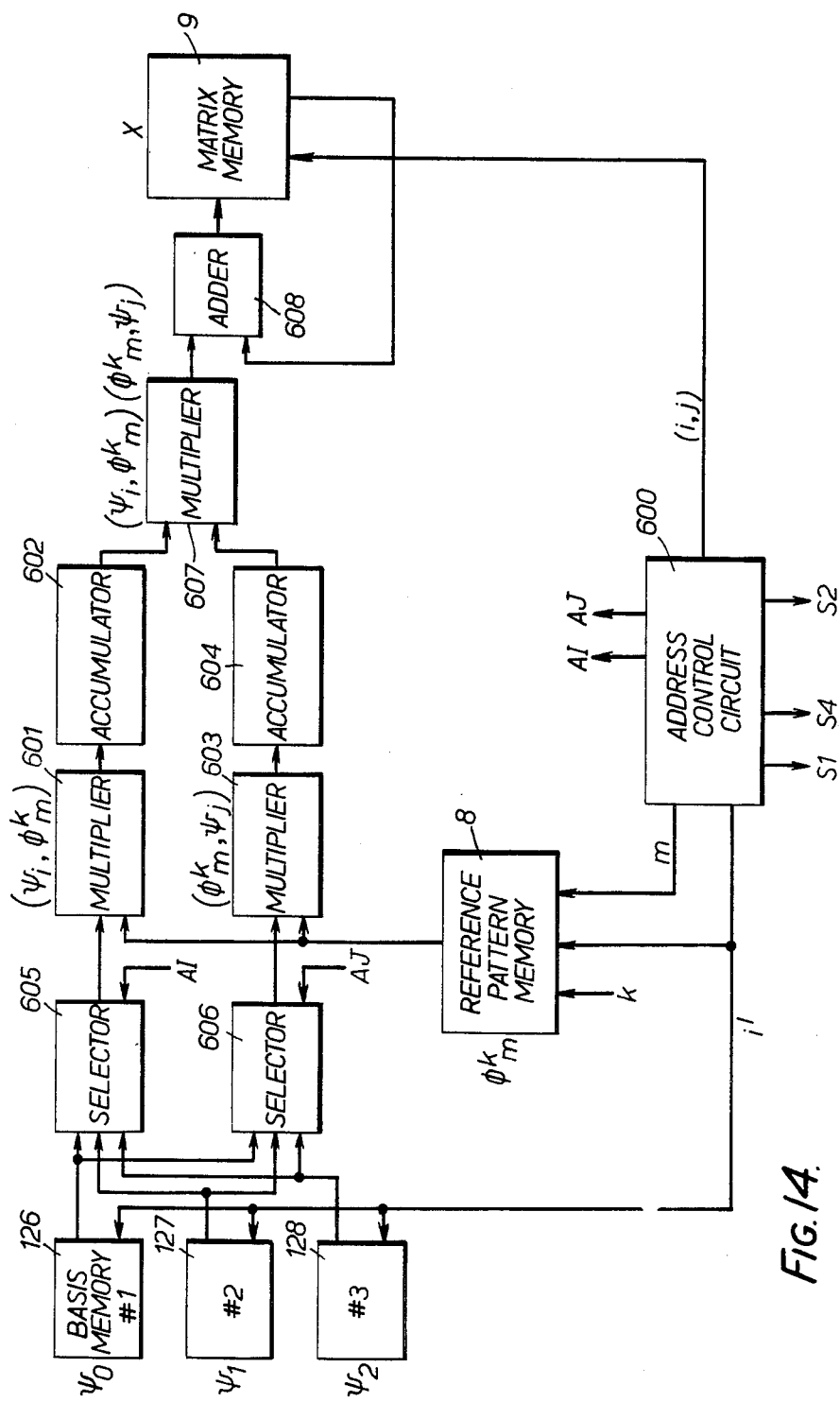
FIG. 14 is another embodiment of matrix calculating unit 7 shown in FIG. 8.

FIG. 14 shows another embodiment of matrix generating unit 7 in FIG. 8. The unit calculates an X matrix instead of matrix QPQ. Address control circuit 600 supplies addresses to base memories 126, 127, 128, reference pattern memory 8 and matrix memory 9. A first inner product circuit comprising multiplier 601 and accumulator 602 calculates an inner product between one of the reference pattern $\phi_m{}^k$ in the reference pattern memory 8 and base $\psi i$ selected by selector 605 in response to selection signal AI from address control circuit 600. A second inner product circuit comprising multiplier 601 and accumulator 602 calculates an inner product between one of the reference patterns $\phi_m{}^k$ and the base $\psi j$ selected by selector 606 in response to selection signal AJ from circuit 600. The outputs of these inner product circuits are multiplied by multiplier 607. The output of multiplier 607 is added to the contents of matrix memory 9 by adder 608. The result is written into matrix memory 9. The above operation is repeated for each reference pattern $\phi_m{}^k$ of the same category (m=0, 1, ..., M-1).

The advantage of the matrix generating unit shown in FIG. 4 is that the size of the X matrix is very small compared to the size of matrix QPQ so that the calculation time for generating the matrix and calculating the eigenvalues is reduced.

Figure 15:
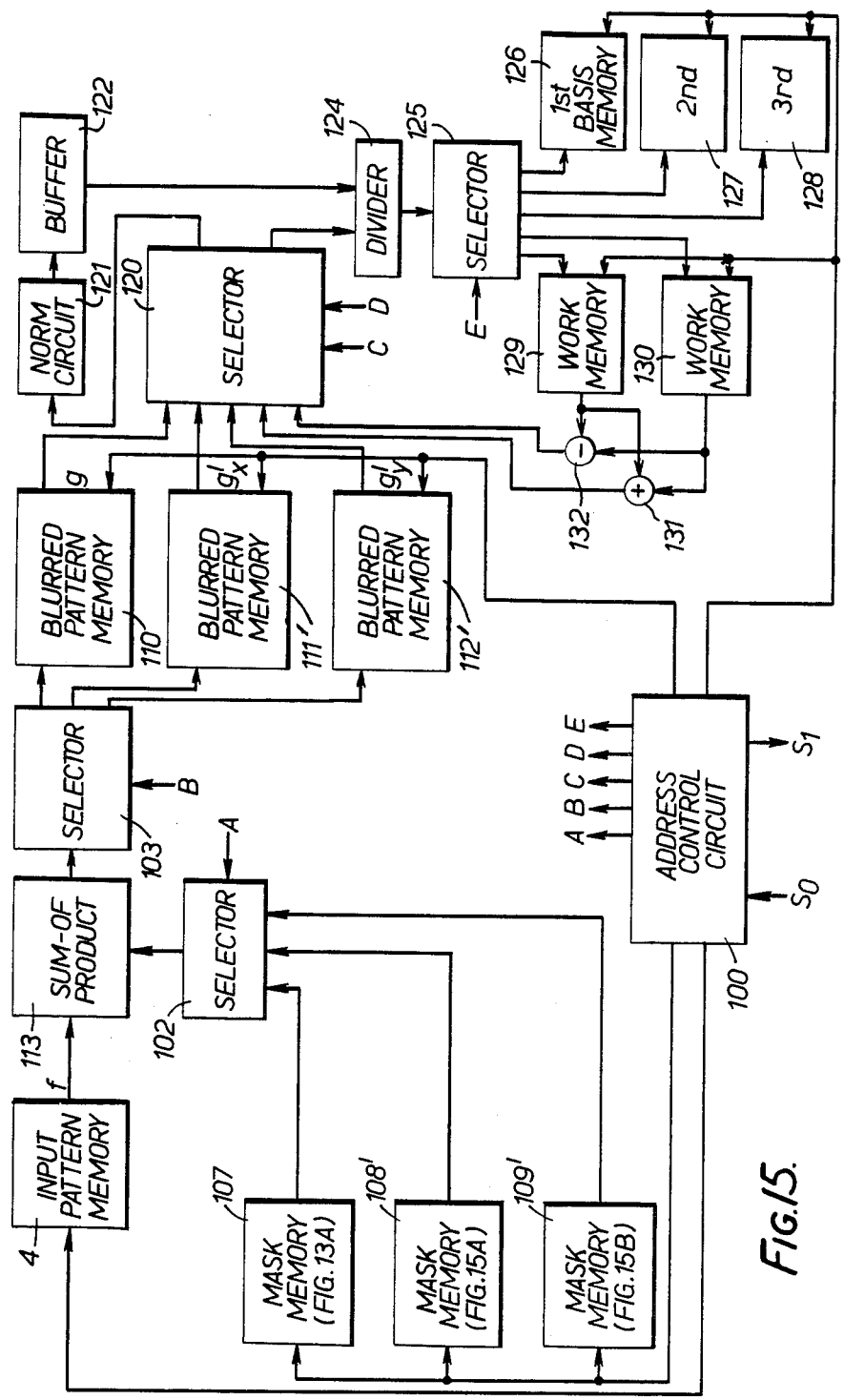
FIG. 15 is another embodiment of basis generating unit 5 shown in FIG. 8.

FIG. 15 shows another embodiment of basis generating unit 5 i FIG. 8. In this embodiment, each base is derived by a direct masking operation of the input vector. There are provided mask memories 108' and 109' which store differential blurring masks. The mask in memory 108' is derived by partial-differentiation of the Gaussian function to the x-direction such as shown in FIG. 16A. The mask in memory 109' is derived by partial-diferentiation of the Gaussian function to the y-direction such as shown in FIG. 16B. The first blurred pattern g is obtained by sum-of-product circuit 113 according to a calculation between input vector f and mask pattern data stored in mask memory 107. The second blurred pattern gx and the third blurred pattern gy are obtained by the same operation and they are stored in blurred pattern memories 111' and 112', respectively.

It is noted that many modifications and variations of the above described embodiments of the present invention will become apparent to those of ordinary skill in the art from a reading of this disclosure. The invention is not limited to the particular apparatus disclosed, its scope is governed only by the scope of the appended claims.

What is claimed is:

1. A pattern recognition apparatus, said apparatus comprising:
   memory means for storing a plurality of reference patterns for each category of a predetermined set of patterns, said reference patterns being orthnormalized with respect to each other;
   input vector generating means for generating an input vector by extracting a feature from an unknown input pattern;
   basis generating means coupled to said input vector generating means for generating a plurality of bases by deforming said input vector, said bases being orthonormalized with respect to each other;
   matrix producing means coupled to said memory means and said bases generating means for producing a matrix for each category of said set of patterns, said matrix being formed from a plurality of data elements derived from said bases generated by said basis generating means and from said reference patterns stored in said memory means; and
   determining means coupled to said matrix producing means for analyzing each of said matrixes to determine the category to which said input pattern belongs.

2. A pattern recognition apparatus according to claim 1, further comprising:
   calculating means coupled to said basis generating means and said matrix generating means for obtaining the maximum eigenvalue of said matrix for each category of said set of patterns.

3. A pattern recognition apparatus according to claim 2, further comprising:
   comparing means coupled to said calculating means for comparing each of said maximum eigenvalues obtained from said calculating means to select the maximum value among said maximum eigenvalues said selected maximum value representing the category to which said input pattern belongs.

4. A pattern recognition apparatus according to claim 3, wherein said comparing means further comprises:
   selection means for selecting the next maximum eigenvalue below said selected maximum value;
   means coupled to said selection means for comparing said selected maximum value with a predetermined value; and
   means for comparing said selected maximum value and said next selected maximum value to determine the difference therebetween.

5. A pattern recognition apparatus according to claim 1, wherein said basis generating means includes:
   blurring means for generating a blurred pattern from said input vector;
   differential means coupled to said blurring means for generating a plurality of differential patterns from said blurred pattern; and
   orthonormalizing means coupled to said differential means for obtaining a plurality of orthonormalized bases, said bases being orthonormalized with respect to each other.

6. A pattern recognition apparatus according to claim 1, wherein said basis generating means includes:
   mask storing means for storing a plurality of mask patterns;
   masking means coupled to said mask storing means for executing a mask operation between said input vector and each of said mask patterns stored in said mask storing means to generate a plurality of resultant masked patterns; and
   orthnormalizing means coupled to said masking means for orthnormalizing said resultant mask patterns.

7. A pattern recognition apparatus according to claim 6 wherein said mask storing means stores a blurring mask pattern corresponding to a Gaussian function.

8. A pattern recognition apparatus according to claim 1, wherein said matrix generating means includes:
   projector generating means for generating a first projector corresponding to said bases generated by said basis generating means and a second projector corresponding to said reference patterns, and multiplying means coupled to said projector generating means for multiplying said first and second projectors to provide said data elements for said matrix.

9. A pattern recognition apparatus according to claim 1, wherein said matrix generating means includes;

multiplying means for multiplying each of said bases by each of said reference patterns and obtaining a product for each said multiplication; and summing means coupled to said multiplying means for summing said products to provide said data elements for said matrix.

10. A pattern recognition apparatus according to claim 2, wherein said calculating means calculates the eigenvalues of said matrixes by a power method.

11. A pattern recognition apparatus for determining the category to which an unknown input pattern belongs, said apparatus comprising:

storing means for storing a plurality of reference patterns for each category of a predetermined set of patterns, said plurality of reference patterns forming a first subspace;

basis generating means, for generating a plurality of bases from an input pattern, said bases forming a second subspace;

matrix producing means for producing a matrix for each category of said set of patterns, said matrix being formed from a plurality of data elements derived from said bases generated by said basis generating means and from said plurality of reference patterns stored in said storage means;

calculating means coupled to said storing means and said basis generating means for calculating a similarity value relating to an angle between said first and said second subspace for each category of said set of patterns; and determining means coupled to said calculating means for determining the category to which said unknown input pattern belongs by comparing each of said calculated similarity values.

12. A pattern recognition apparatus according to claim 11 wherein said calculating means includes:

eigenvalue calculating means coupled to said matrix producing means for obtaining eigenvalues for each of said matrixes produced by said matrix producing means; and detecting means coupled to said eigenvalue calculating means for detecting the maximum eigenvalue for each matrix.

13. A pattern recognition apparatus according to claim 12 wherein said determining means compares each of the maximum eigenvalues to select the maximum value among said maximum eigenvalues.

14. A method for recognizing an unknown input pattern, said method comprising the steps of:

storing a plurality of reference patterns in memory means for each category of a predetermined set of patterns, said reference patterns being orthnormalized with respect to each other;

generating an input vector by extracting a feature from an unknown input pattern;

generating a plurality of bases from a basis generating means by deforming said input vector, said bases being orthonormalized with respect to each other;

producing a matrix for each category of said set of patterns, said matrix being formed from a plurality of data elements derived from said bases generated by said basis generating means and from said reference patterns stored in said memory means; and analyzing each of said matrixes to determine the category to which said input patterns belongs.

15. A method for recognizing an unknown input pattern according to claim 14, further comprising the step of:

obtaining the maximum eigenvalue of said matrix for each category of said set of patterns.

16. A method for recognizing an unknown input pattern according to claim 15, further comprising the step of:

comparing each of said maximum eigenvalues to select a maximum value among said maximum eigenvalues to determine the category to which said input pattern belong.

17. A method for recognizing an unknown input pattern according to claim 14, further comprising the steps of:

generating a blurred pattern from said input vector;

generating a plurality of differential patterns from said blurred pattern;

obtaining a plurality of orthonormalized bases, said bases being orthonormalized with respect to each other.

18. A method for recognizing an unknown input pattern according to claim 14, further comprising the steps of:

storing a plurality of mask patterns;

executing a mask operation between said input vector and each of said mask patterns to generate a plurality of resultant mask patterns; and orthonormalizing said resultant masked patterns.

19. A method for recognizing an unknown input pattern according to claim 14, wherein said step of producing a matrix comprises the steps of:

generating a first projector corresponding to said bases generated by said basis generating means and a second projector corresponding to said reference patterns, and multiplying said first and second projectors to provide said data elements for said matrix.

20. A method for recognizing an unknown input pattern according to claim 14, wherein said step of producing a matrix comprises the steps of:

multiplying each of said bases by each of said reference patterns and obtaining a product for each such multiplication; and summing said products to provide said data elements for said matrix.

21. A method for recognizing an unknown input pattern, said method comprising the steps of:

storing a plurality of reference patterns for each category of a predetermined set of patterns, said plurality of reference patterns forming a first subspace;

generating a plurality of bases from an input pattern, said bases forming a second subspace;

calculating a similarity value relating to an angle between said first and said second subspace for each category of said set of patterns; and determining the category to which said unknown input pattern belongs by comparing each of said calculated similarity values.

22. A method for recognizing an unknown input according to claim 21, wherein said step of calculating a similarity value comprises the steps of:

producing a matrix for each category of said set of patterns, said matrix being formed from a plurality of data elements derived from said bases and from said plurality of reference patterns;

obtaining eigenvalues for each of said matrixes; and detecting the maximum eigenvalue for each matrix.

* * * * *